United States Patent [19]

Böhm

[11] Patent Number: 5,648,309

[45] Date of Patent: Jul. 15, 1997

[54] PROCESS FOR THE PREPARATION OF A POLY-1-OLEFIN

[75] Inventor: Ludwig Böhm, Hattersheim am Main, Germany

[73] Assignee: Hoechst Aktiengesellschaft, Germany

[21] Appl. No.: 400,114

[22] Filed: Mar. 6, 1995

Related U.S. Application Data

[63] Continuation of Ser. No. 279,264, Jul. 21, 1994, abandoned, which is a continuation of Ser. No. 949,528, filed as PCT/EP91/00966, May 24, 1991 published as WO91/18934, Dec. 12, 1991, abandoned.

[30] Foreign Application Priority Data

Jun. 1, 1990 [DE] Germany .................. 40 17 661.4

[51] Int. Cl.$^6$ .................................................. C08F 4/64
[52] U.S. Cl. ..................... 502/105; 502/104; 502/117; 502/133; 526/124.2; 526/352
[58] Field of Search ............................. 502/104, 105, 502/117, 133; 526/124.2, 352

[56] References Cited

U.S. PATENT DOCUMENTS

| | | | |
|---|---|---|---|
| 3,644,318 | 2/1972 | Diedrich et al. | 260/88.2 |
| 4,399,054 | 8/1983 | Ferraris et al. | 252/429 B |
| 4,517,307 | 5/1985 | Cuffiani et al. | 502/119 |
| 4,605,714 | 8/1986 | Baker | 526/125 |
| 4,686,265 | 8/1987 | Maruyama et al. | 526/125 |
| 4,716,206 | 12/1987 | Fujita et al. | 526/139 |
| 4,847,227 | 7/1989 | Murai et al. | 502/127 |

FOREIGN PATENT DOCUMENTS

| | | |
|---|---|---|
| 0 095 138 | 11/1983 | European Pat. Off. . |
| 0 223 011 | 5/1987 | European Pat. Off. . |
| 2 016 081 | 4/1970 | France . |
| 3 323 729 | 1/1985 | Germany . |

OTHER PUBLICATIONS

International Appln. incl. Search Report dated Sep. 17, 1991; WO 91/18934; PCT/EP91/00966.

Translation of International Preliminary Examination Report, PCT/EP91/00966.

*Primary Examiner*—David W. Wu
*Attorney, Agent, or Firm*—Connolly & Hutz

[57] ABSTRACT

A Ziegler catalyst in which the transition metal component has been prepared by reacting a transition metal compound of titanium, zirconium, vanadium or chromium with a gel-like dispersion of a magnesium alcoholate is used for the preparation of poly-1-olefins, in particular polyethylene. The co-catalyst used is an organoaluminum compound. The polymers are obtained in a high to very high yield, and it is possible to control the particle size distribution of the polymers.

15 Claims, No Drawings

PROCESS FOR THE PREPARATION OF A POLY-1-OLEFIN

This application is continuation of my application Ser. No. 08/279,264, filed Jul. 21, 1994, now abandoned, which was a continuation of Ser. No. 07/949,528, filed as PCT/EP91/00966, May 24, 1991 published as WO91/18934, Dec. 12, 1991, now abandoned.

The invention relates to a process for the preparation of a poly-1-olefin using a catalyst based on a gel-like magnesium alcoholate dispersion.

Solids can be prepared from magnesium alcoholates $Mg(OR^1)(OR^2)$ or "complex" magnesium alcoholates by reaction with compounds of titanium, zirconium, vanadium or chromium, and these solids, together with magnesium alcoh compounds of the 1st to 3rd main groups of the periodic table, produce excellent catalysts for olefin polymerization.

A process is known for the polymerization of $\alpha$-olefins in the presence of a mixed catalyst in which the component A has been prepared by reacting magnesium alcoholates with tetravalent halogen-containing titanium compounds (cf. U.S. Pat. No. 3,644,318). The magnesium alcoholates are employed in the form in which they are available commercially. The polymers obtainable by this process have a narrow molecular weight distribution.

A process is also known for the preparation of a Ziegler catalyst, in which a dissolved magnesium alcoholate is reacted with a halogen-containing Ti or V compound and a transition metal alcoholate (cf. EP 319, 173). The catalyst particles thus formed are spherical and have an average particle size of 10 to 70 µm.

Finally, it is known to use (cf. EP 223, 011) as the transition metal component a product from the reaction of a tetravalent, halogen-containing titanium compound with a magnesium alcoholate containing at least 40% by weight of particles having a diameter smaller than 63 µm. A magnesium alcoholate of this particle size is obtained, inter alia, by grinding a commercial product in a ball mill. The magnesium alcoholate is employed in the form of a suspension in an inert hydrocarbon. However, the known catalysts are still not satisfactory.

It has been found that catalysts having a high to very high activity and enabling the particle size distribution of the polymer to be controlled are obtained if the magnesium alcoholate is employed in the form of a gel-like dispersion.

The invention therefore relates to a process for the preparation of a poly-1-olefin by polymerizing a 1-olefin of the formula $R^4CH=CH_2$ in which $R^4$ is hydrogen or an alkyl radical having 1 to 10 carbon atoms, in suspension, in solution or in the gas phase, at a temperature of 20° to 200° C. and under a pressure of 0.5 to 50 bar, in the presence of a catalyst composed of the reaction product of a magnesium alcoholate with a transition metal compound (component a) and an organometallic compound of a metal of group I, II or III of the periodic table (component b), which comprises carrying out the polymerization in the presence of a catalyst in which the component a has been prepared by reacting a transition metal compound of titanium, zirconium, vanadium or chromium with a gel-like dispersion of the magnesium alcoholate in an inert, saturated hydrocarbon, obtainable by treating a magnesium alcoholate suspension using a high-speed disperser.

The invention also relates to the catalyst employed in these processes.

A commercially available magnesium alcoholate is used for the preparation of the component a.

This magnesium alcoholate can be a "simple" magnesium alcoholate of the formula $Mg(OR^1)(OR^2)$ in which $R^1$ and $R^2$ are identical or different and are each an alkyl radical having 1 to 6 carbon atoms. Examples are $Mg(OC_2H_5)_2$, $Mg(OiC_3H_7)_2$, $Mg(OnC_4H_9)_2$, $Mg(OCH_3)(OC_2H_5)$ and $Mg(OC_2H_5)(OnC_3H_7)$. It is also possible to use a "simple" magnesium alcoholate of the formula $Mg(OR)_nX_m$ in which X is halogen, $(SO_4)_{1/2}$, OH, $(CO_3)_{1/2}$, $(PO_4)_{1/3}$ or Cl, R has the abovementioned meaning of $R^1$ or $R^2$ and n+m is 2.

It is also possible, however, to employ a "complex" magnesium alcoholate. A "complex" magnesium alcoholate signifies a magnesium alcoholate which, as well as magnesium, contains at least one metal of the 1st to 4th main groups of the periodic table. The following are examples of complex magnesium alcoholates of this type:
$[Mg(OiC_3H_7)_4]Li_2$; $[Al_2(OiC_3H_7)_8]Mg$; $[Si(OC_2H_5)_6]Mg$; $[Mg(OC_2H_5)_3]Na$; $[Al_2(OiC_4H_9)_8]Mg$; $[Al_2(O\text{-sec}C_4H_9)_6(OC_2H_5)_2]Mg$. The preparation of the complex magnesium alcoholates (alkoxo salts) is effected by known methods. The following examples of the preparation may be mentioned:

1. Two metal alcoholates are allowed to act on one another in a suitable solvent, for example $2Al(OR)_3 + Mg(OR)_2 \rightarrow [Al_2(OR)_8]Mg$
2. Magnesium is dissolved in an alcoholic solution of a metal alcoholate, $2LiOR + Mg + 2\ ROH \rightarrow [Mg(OR)_4]Li_2 + H_2$
3. Two metals are dissolved in alcohol at the same time, $8\ ROH + Mg + 2\ Al \rightarrow [Al_2(OR)_8]Mg + 4\ H_2$.

It is preferable to use a simple magnesium alcoholate, in particular $Mg(OC_2H_5)_2$, $Mg(OnC_3H_7)_2$ or $Mg(OiC_3H_7)_2$. The magnesium alcoholate is employed in the pure form.

In general, commercially available $Mg(OC_2H_5)_2$ has the following specification:

| | |
|---|---|
| Mg content | 21–22% by weight |
| Total of $Mg(OH)_2$ and $MgCO_3$ | $\leq 1\%$ by weight |
| $C_2H_5OH$ content | <0.3% by weight. |

The average particle diameter is 500 µm. 90% of the particles have a particle diameter within the range from 200 to 1200 µm.

The magnesium alcoholate is suspended in an inert, saturated hydrocarbon. The suspension is converted into a gel-like magnesium alcoholate dispersion under a protective gas (Ar or $N_2$) in a reactor by means of a high-speed disperser (for example ●Ultra-Turrax or ●Dispax, IKA-Maschinenbau Janke & Kunkel GmbH).

This dispersion differs from the suspension in two essential characteristics. It is substantially more viscous than the suspension and is gel-like, and, compared with the suspended magnesium alcoholate, the dispersed magnesium alcoholate settles out very much more slowly and to a far lesser extent (after a few hours, volume of the supernatant hydrocarbon approx. 80% by volume in the case of suspended magnesium alcoholate and approx. 10% by volume in the case of dispersed magnesium alcoholate, at the same content (131 g/l dm³)).

The dispersed magnesium alcoholate can also be prepared by mechanical comminution with glass spheres (ø 1 cm) in a round-bottomed flask, the contents of the flask being agitated by means of a two-bladed stirrer. However, this process is very time-consuming.

A suitable inert, saturated hydrocarbon is an aliphatic or cycloaliphatic hydrocarbon, such as butane, pentane, hexane, heptane, isooctane, cyclohexane or methylcyclohexane, and also an aromatic hydrocarbon, such as toluene or xylene; it is also possible to use hydrogenated diesel oil or benzynine fractions which have been carefully freed from oxygen, sulfur compounds and moisture.

The gel-like dispersion is then reacted, in one stage or in several stages, with a Ti compound (TiCl$_4$, Ti(OR)$_4$ and others), Zr compound (Zr(OR)$_4$ and others), V compound (VCl$_4$, VOCl$_3$ and others) or Cr compound (CrO$_2$Cl$_2$ and others).

In this reaction the magnesium alcoholate is reacted with the transition metal compound at a temperature of 50° to 100° C., preferably 60° to 90° C., in the presence of an inert hydrocarbon and with stirring. 0.9 to 5 mol of transition metal compound are employed per 1 mol of magnesium alcoholate, preferably 1.4 to 3.5 mol of transition metal compound per 1 mol of magnesium alcoholate.

The reaction time is 0.5 to 8 hours, preferably 2 to 6 hours.

This gives a solid insoluble in hydrocarbon and containing magnesium and transition metal, which is known as component a.

The preparation of the polymerization catalyst to be used in accordance with the invention is effected by combining the component a and an organometallic compound of a metal of group I, II or III of the periodic table (component b).

The component a in the form of a suspension can be reacted, without further treatment, with the component b; it can, however, also be first isolated as a solid, stored and resuspended for subsequent use.

It is preferable to use organoaluminum compounds as the component b. Suitable organoaluminum compounds are chlorine-containing organoaluminum compounds, the dialkylaluminum monochlorides of the formula R$_2^3$AlCl or alkylaluminum sesquichloride of the formula R$_3^3$Al$_2$Cl$_2$, in which R$^3$ is an alkyl radical having 1 to 16 carbon atoms. (C$_2$H$_5$)$_2$AlCl, (iC$_4$H$_9$)$_2$AlCl and (C$_2$H$_5$)$_3$Al$_2$Cl$_3$ may be mentioned as examples. It is also possible to use mixtures of these compounds.

It is particularly preferable to employ chlorine-free compounds as organoaluminum compounds. Suitable for this purpose are, on the one hand, the reaction products of aluminum trialkyls or aluminum dialkylhydrides having hydrocarbon radicals having 1 to 6 carbon atoms, prferably Al(iC$_4$H$_9$)$_3$ or Al(iC$_4$H$_9$)$_2$H, with diolefins containing 4 to 20 carbon atoms, preferably isoprene. Isoprenylaluminum may be mentioned as an example.

On the other hand, suitable chlorine-free organoaluminum compounds of this type are aluminum trialkyls AlR$_3^3$ or aluminum dialkylhydrides of the formula Al$_2^3$H in which R$^3$ is an alkyl radical having 1 to 16 carbon atoms. Al(C$_2$H$_5$)$_3$, Al(C$_2$H$_5$)$_2$H, Al(C$_3$H$_7$)$_3$, Al(C$_3$H$_7$)$_2$H, Al(iC$_4$H$_9$)$_3$, Al(iC$_4$H$_9$)$_2$H, Al(C$_8$H$_{17}$)$_3$, Al(C$_{12}$H$_{25}$)$_3$, Al(C$_2$H$_5$)(C$_{12}$H$_{25}$)$_2$ and Al(iC$_4$H$_9$)(C$_{12}$H$_{25}$)$_2$ are examples.

It is also possible to employ mixtures of organometallic compounds of metals of group I, II or III of the periodic table, particularly mixtures of different organoaluminum compounds.

The following mixtures may be mentioned as examples: Al(C$_2$H$_5$)$_3$ and Al(iC$_4$H$_9$)$_3$, Al(C$_2$H$_5$)$_2$Cl and Al(C$_8$H$_{17}$)$_3$, Al(C$_2$H$_5$)$_3$ and Al(C$_8$H$_{17}$)$_3$, Al(C$_4$H$_9$)$_2$H and Al(C$_8$H$_{17}$)$_3$, Al(iC$_4$H$_9$)$_3$ and Al(C$_8$H$_{17}$)$_3$, Al(C$_2$H$_5$)$_3$ and Al(C$_{12}$H$_{25}$)$_3$, Al(iC$_4$H$_9$)$_3$ and Al(C$_{12}$H$_{25}$)$_3$, Al(C$_2$H$_5$)$_3$ and Al(C$_{16}$H$_{33}$)$_3$, Al(C$_3$H$_7$)$_3$ and Al(C$_{18}$H$_{37}$)$_2$(iC$_4$H$_9$), Al(C$_2$H$_5$)$_3$ and isoprenylaluminum (the reaction product of isoprene with Al(iC$_4$H$_9$)$_3$ or Al(iC$_4$H$_9$)$_2$H).

Mixing of the component a and the component b can be carried out before polymerization, in a stirred vessel at a temperature of −30° C. to 150° C., preferably −10° to 120° C. It is also possible to combine the two components without further treatment in the polymerization vessel at a temperature of 20° to 200° C. It is also possible, however, to add the component b in two stages, by preactivating, before the polymerization reaction, the component a with part of the component b at a temperature of −30° C. to 150° C., and adding the remainder of the component b in the polymerization reactor at a temperature of 20° to 200° C.

The polymerization catalyst to be used in accordance with the invention is employed for the polymerization of 1-olefins of the formula R$^4$—CH=CH$_2$ in which R$^4$ is a hydrogen atom or an alkyl radical having 1 to 10 carbon atoms, for example ethylene, propylene, but-1-ene, hex-1-ene, 4-methylpent-1-ene or oct-1-ene.

It is preferable to polymerize ethylene on its own or as a mixture of at least 50% by weight of ethylene and not more than 50% by weight of another 1-olefin of the above formula.

In particular, ethylene on its own or a mixture of at least 90% by weight of ethylene and not more than 10% by weight of another 1-olefin of the above formula is polymerized.

The polymerization is carried out in a known manner in solution, in suspension or in the gas phase, continuously or batchwise, in one or more stages and at a temperature of 20° to 200° C., preferably 50° to 150° C. The pressure is 0.5 to 50 bar. Polymerization is preferably effected in the pressure range from 5 to 30 bar which is of particular industrial interest.

In this reaction the component a is used in a concentration, relative to transition metal, of 0.0001 to 1, preferably 0.001 to 0.5, mmol of transition metal per dm$^3$ of dispersing agent. The organometallic compound is used in a concentration of 0.1 to 5 mmol, preferably 0.5 to 4 mmol per dm$^3$ of dispersing agent. In principle, however, higher concentrations are also possible.

The suspension polymerization is carried out in an inert dispersing agent which is customary for the Ziegler low pressure process, for example in an aliphatic or cycloaliphatic hydrocarbon; examples of these which may be mentioned are butane, pentane, hexane, heptane, isooctane, cyclohexane or methylcyclohexane. It is also possible to use gasoline fractions or hydrogenated diesel oil fractions which have been carefully freed from oxygen, sulfur compounds and moisture.

The gas phase polymerization can be carried out without further treatment or after prepolymerization of the catalyst in a suspension process.

The molecular weight of the polymer is controlled in a known manner, it being preferable to use hydrogen for this purpose.

As a result of the high activity of the catalyst used, the process according to the invention gives polymers having a very low content of transition metal and halogen, and, therefore, extremely good values in the color stability and corrosion test.

The process according to the invention also makes it possible to prepare the catalysts in such a way that the particle size distribution and, to a certain extent, also the particle shape of the polymer powder formed can thereby be adjusted.

In general, an improved particle morphology, a high average particle diameter (d$_{50}$ values), a narrow particle size distribution, no coarse and fine fractions and high catalyst productivities are obtained. The bulk densities are comparable with those of the state of the art.

Thus it is possible, when using these gel-like dispersions of magnesium alcoholates, to influence the morphological properties of the polymer powder, which affords advantages for an industrial process (filtration of the polymer powder is simpler, the residual contents of dispersing agent are lower and, as a result, the energy expended in drying is lower, the transport of the polymer powder in the plant is simpler, its pourability is better and the proportion of fines in the cyclones of the driers is lower). The high catalyst productivity results in lower residual contents of catalyst in the product.

The following examples are intended to illustrate the invention.

A hydrogenated diesel oil fraction having a boiling range from 130° to 170° C. was used in the examples for preparation of the catalyst and for polymerization.

The Mg:Ti:Cl ratios used for characterizing the catalysts were determined by customary analytical methods.

The titanium content by weight of the catalyst used to calculate the catalyst productivity CP (see tables) was determined as follows:

A definite volume of the catalyst suspension was removed by pipette. The catalyst was hydrolyzed with sulfuric acid and the titanium content was determined by known methods.

Result: titanium content (mmol) per unit volume ($cm^3$).

A second sample of the suspension was removed by pipette, the suspending agent was removed in vacuo and the solid was weighed.

Result: solid (g) per unit volume ($cm^3$). The ratio of these gives mmol of Ti/g of catalyst.

EXAMPLE 1

1.2 mol of $Mg(OC_2H_5)_2$ ($\hat{=}137$ g) were suspended in 1.0 $dm^3$ (l) of diesel oil. The suspension was converted into a dispersion under a protective gas (Ar or $N_2$), in order to exclude moisture and air ($O_2$), in a cylindrical glass vessel by means of a high-speed disperser (time approx. 3 hours). The dispersion had a gel-like consistency. The difference between the suspension and the dispersion could be seen without difficulty.

Comparison Example A

Preparation of the catalyst component a using an $Mg(OC_2H_5)_2$ suspension.

57 g of $Mg(OC_2H_5)_2$ were suspended in 0.5 $dm^3$ (l) of diesel oil (a hydrogenated gasoline fraction having a boiling range of 120°–140° C.) in a 2 $dm^2$ stirred vessel equipped with a reflux condenser, a 2-blade paddle stirrer and blanketing with protective gas (Ar). The suspension was brought to 85° C. The stirrer speed was set at 350 r.p.m. (optimum stirrer speed when using suspended Mg alcoholate; if the stirrer speed is set lower, inhomogeneous, unusable catalysts are formed). 0.15 mol of $TiCl_4$ in 350 $cm^3$ of diesel oil were metered in in the course of 4 hours. The resulting suspension was then heated at 110° C. for 1 hour. A mixture of 0.2 mol of $Al(C_2H_5)Cl_2$ and 0.2 mol of $Al(C_2H_5)Cl$ in 400 $cm^3$ of diesel oil was then metered in in the course of 2 hours. The temperature was then kept at 110° C. for a further 2 hours. This concluded the preparation of the catalyst component a. The suspension of solids was allowed to cool to room temperature. The molar ratio was: Mg:Ti:Cl≈1:0.3:2.4. This catalyst component a was given the operation number 2.1.

EXAMPLE 2

A catalyst was prepared by the process of Comparison Example A, using the gel-like dispersion of $Mg(OC_2H_5)_2$ prepared in accordance with Example 1 (in this case there is no particle size distribution; the average particle diameter is ≦1 μm). The molar ratio was approximately: Mg:Ti:Cl≈1:0.3:2.4. This catalyst component was given the operation number 2.2.

EXAMPLE 3

57 g of $Mg(OC_2H_5)_2$ were dispersed in 0.5 $dm^3$ of diesel oil in a 2 $dm^3$ stirred vessel equipped with a reflux condenser, a stirrer and blanketing with protective gas (Ar). The gel-like dispersion was brought to 85° C. The stirrer speed was adjusted to 150 rpm 0.15 mol of $TiCl_4$ in 350 $cm^3$ of diesel oil were metered in in the course of 4 hours.

The subsequent reaction of the resulting suspension with $Al(C_2H_2)Cl_2$ and $Al(C_2H_5)_2Cl$ was carried out as described in Comparison Example A.

The molar ratio was approximately: Mg:Ti:Cl≈1:0.3:2.4. This catalyst component was given the operation number 2.3.

EXAMPLE 4

Preparation was carried out as in Example 3, but the reaction was carried out at 85° C. at a stirrer speed of 75 rpm. The molar ratio was: Mg:Ti:Cl=1:0.3:2. This catalyst component a was given the operation number 2.4.

If a magnesium ethylate suspension as in Comparison Example A is used, and the stirrer speed is altered (cf. Examples 2 to 4), unusable catalysts are obtained, because the suspended magnesium ethylate does not react uniformly and thus a homogeneous catalyst suspension is not formed. If the stirrer speed is increased (>350 r.p.m.), homogeneous catalysts are obtained, but these form a very fine polymer powder and are thus again not optimum.

Comparison Example B

Comparison Example A was repeated using an $Mg(OC_2H_5)_2$ suspension obtained from finely divided $Mg(OC_2H_5)_2$ ($d_{50}$≈6 μm). The molar ratio Mg:Ti:Cl was about 1:0.3:2.4. This catalyst component a was given the operation number 2.5.

The suspension had a milky cloudiness, whereas the $Mg(OC_2H_5)_2$ dispersion was only slightly cloudy (Tyndall phenomenon).

EXAMPLE 5

Polymerization tests using catalysts of operation number 2.1 to 2.4 and 2.5.

The polymerization tests were carried out batchwise in a 200 $dm^3$ reactor. This reactor was equipped with an impeller stirrer and a flow breaker. The temperature in the reactor was measured and was kept constant by automatic means. The polymerization temperature was 85°±1° C. The polymerization reaction was carried out in the following manner:

100 $dm^3$ of diesel oil were run into the reactor, which was blanketed with $N_2$, and were heated to 85° C. The co-catalyst ($Al(C_2H_5)_3$) was then added under $N_2$ at such a rate that the concentration of co-catalyst in the reactor was 0.14 mmol/$dm^3$. The catalyst component a was then added, the catalyst content in the diesel oil being ≈1 mmol/$dm^3$. The catalyst content was quoted in g-atoms of titanium. The titanium content in the suspension of solids was determined colorimetrically.

The pressure in the reactor was repeatedly pressurized to 8 bar with $H_2$ (hydrogen) and depressurized, in order to remove the nitrogen completely from the reactor (the procedure was checked by measuring the $H_2$ concentration in the gas space of the reactor, which finally indicated 95% by volume). The polymerization was initiated by opening the ethylene inlet. During the whole polymerization time ethylene was fed in at a rate of 7.0 kg/hour. The content of ethylene and hydrogen in the gas space of the reactor was measured continuously and the volume ratios were kept constant by suitably metering in hydrogen (% by volume of $H_2$=50; % by volume of $C_2H_4$=45).

The polymerization was terminated when the total pressure had reached 9.5 bar. The contents of the reactor were drained off onto a filter. The polymer, which contained diesel oil, was dried for several hours in a stream of nitrogen. The polymerization results are shown in Table 1.

The particle size distribution of the polymer powder, which is shown in Table 2 (as specified in DIN 66 144), shows the great increase in the $d_{50}$ value at a parallel displacement of the curves. This means that the particle size distribution remains the same, the increase is only in the median particle diameter. Therefore the fine fractions (<100 µm) decrease considerably, which is particularly advantageous.

It can also be seen that the catalyst productivity increases greatly with a simultaneous increase in the melt flow index values at the same hydrogen content in the gas space of the reactor.

All the products obtained had a narrow molecular weight distribution as measured by GPC. The $M_w/M_n$ values were between 5 and 6. These were therefore injection molding products.

Comparison Example C 57 g of $Mg(OC_2H_5)_2$ were suspended in 0.5 $dm^3$ (1) of diesel oil (a hydrogenated gasoline fraction having a boiling range of 120°–140° C.) in a 2 $dm^3$ stirred vessel equipped with a reflux condenser, a 2-bladed paddle stirrer and blanketing with protective gas (Ar). The suspension was brought to 85° C. The stirrer speed was set at 350 r.p.m. 1.0 mol of $TiCl_4$ (undiluted) was added dropwise in the course of 4 hours. After the $TiCl_4$ had been added the batch was allowed to react further for 1 hour under the conditions indicated above. The suspension of solids formed was washed several times with fresh diesel oil at 60° C. until the titanium content in the suspending agent was less than 10 mmol. When this had been achieved the suspension of solids was allowed to cool to room temperature.

The molar ratio Mg:Ti:Cl was approximately: 1:0.085:2.1. This catalyst component a was given the operation number 3.1.

EXAMPLE 6

The preparation of the catalyst component a was carried out similarly to Comparison Example C, using a gel-like $Mg(OC_2H_5)_2$ dispersion, but with the difference that the stirrer speed was 75 r.p.m. The molar ratio Mg:Ti:Cl was approximately: 1:0.17:2.4. This catalyst component a was given the operation number 3.2.

EXAMPLE 7

Polymerization tests using the catalysts of operation number 3.1 and 3.2 were carried out as described in Example 5. The amounts of catalyst and co-catalyst and the composition in the gas space of the reactor (% by volume of $H_2$=36; % by volume of $C_2H_4$=60) were different. The results are collated in Table 3. The sieve analysis data are shown in Table 4.

Comparison Example D 57 g of $Mg(OC_2H_5)_2$ were suspended in 0.5 $dm^3$ of diesel oil (a hydrogenated gasoline fraction having a boiling range of 140°–170° C.) in a 2 $dm^3$ stirred vessel equipped with a reflux condenser, a 2-bladed paddle stirrer and blanketing with protective gas (Ar). The suspension was brought to 120° C. The stirrer speed was adjusted to 350 r.p.m. 0.65 mol of $TiCl_4$ (undiluted $TiCl_4$) was added uniformly in the course of 5 hours. The batch was then stirred at 120° C. for 60 hours. It was then cooled to 70° C. and the solid was washed with fresh diesel oil until the titanium content in the diesel oil (dissolved titanium compound) was <5 mmol/$dm^3$. In this method ethyl chloride was split off at 120° C. This catalyst component a was given the operation number 4.1. Mg:Ti:Cl=1:1.3:3.6.

Comparison Example E

Comparison Example D was repeated, using a finely divided suspension of $Mg(OC_2H_5)_3$ ($d_{50}\approx$6 µm). This catalyst component a was given the operation number 4.2. Mg:Ti:Cl≈1:1.3:3.6.

EXAMPLE 8

Preparation of the catalyst component a

Comparison Example D was repeated, using a dispersion of $Mg(OC_2H_5)_2$. The catalyst component a was given the operation number 4.3. Mg:Ti:Cl≈1:1.3:4.

EXAMPLE 9

Polymerization tests were carried out with the catalyst components a of operation numbers 4.1–4.3. The co-catalyst was different. Isoprenylaluminum (commercial product) was employed in this case. It was necessary to alter the amounts of catalyst component a and co-catalyst, and also the composition in the gas space of the reactor (% by volume of $H_2$=55; % by volume of $C_2H_4$=40). The results are collated in Table 4. All the products obtained had a broad distribution of molecular weights as measured by GPC. The $M_w/M_n$ values were between 10 and 15. These were therefore extrusion grades.

It can be seen that the catalyst component a prepared from the gel-like dispersion differs advantageously in median particle size ($d_{50}$ value) and in catalyst productivity from the catalyst components a which were prepared from a suspension of coarse or finely divided magnesium ethylate.

Comparison Example F 57 g of $Mg(OC_2H_5)_2$ were suspended in 0.5 $dm^3$ of diesel oil, at a stirrer speed of 350 r.p.m., in a 2 $dm^2$ stirred vessel equipped with a reflux condenser, a 2-bladed paddle stirrer and blanketing with protective gas (Ar). The suspension was brought to 85° C. 1.25 mol of $TiCl_4$ were added dropwise in the course of 5.5 hours. When the addition of $TiCl_4$ was complete, the batch was stirred at 85° C. for 1 hour. The solid was washed with diesel oil at 65° C. until the Ti content in the diesel oil was <5 mmol/$dm^3$. Sufficient diesel oil was added to reach the original level of filling in the stirred vessel. 60 mmol of $Ti(OC_2H_5)_4$ were then added and the temperature was raised over 20 hours, with stirring. This catalyst component a was given the operation number 5.1. The Mg:Ti:Cl ratio was approximately 1:0.135:2.15.

Comparison Example G

Comparison Example F was repeated, using a finely divided suspension of $Mg(OC_2H_5)_2$ ($d_{50}\approx$6 µm).

The catalyst component a was given the operation number 5.2. The Mg:Ti:Cl ratio was approximately 1:0.14:2.15.

EXAMPLE 10

The catalyst was prepared in accordance with Comparison Example F, using a dispersion of $Mg(OC_2H_5)_2$. The stirrer speed was 350 r.p.m. The catalyst component a was given the operation number 5.3. The Mg:Ti:Cl ratio was approximately 1:0.20:2.3.

EXAMPLE 11

Example 10 was repeated, using a dispersion of $Mg(OC_2H_5)_2$. However, the stirrer speed was 75 r.p.m. The catalyst component a was given the operation number 5.4. The Mg:Ti:Cl ratio was approximately 1:0.28:2.4.

EXAMPLE 12

Polymerization tests were carried out in accordance with Example 5, using the catalyst components a 5.1 to 5.4. Triisobutylaluminum (commercial product) was employed as the co-catalyst. It was necessary to alter the amounts of the catalyst component a and the co-catalyst, and also the composition in the gas space of the reactor (% by volume of $H_2=40$; % by volume of $C_2H_4=55$). The results are collated in Table 4. These catalysts produce a molecular weight distribution, as measured by GPC, with $M_w/M_n$ values of 7–10.

EXAMPLE 13

Copolymerization tests were carried out batchwise in a 200 $dm^3$ reactor using the catalyst component a 4.3. This reactor was equipped with an impeller stirrer and a flow breaker. The temperature was controlled automatically. The temperature of the tests was 85° C.±1° C. The polymerization was carried out in accordance with Example 5. Initial charge: 100 $dm^3$ of diesel oil; co-catalyst: isoprenylaluminum; co-catalyst concentration 1.2 mmol/$dm^3$. % by volume of $H_2$ in the gas space as measured by gas chromatography: 40% by volume. Ethylene feed rate: 5 kg/hour, reaction time: 4 hours.

The polymerization was initiated by opening the ethylene inlet. The comonomer was added 5 minutes later (see Table 5). In order to keep the comonomer content in the gas space (measured by gas chromatography) constant, co-monomer was continuously metered in subsequently (see Table 5). As the time progressed, the pressure in the reactor increased. The pressures after 4 hours are also shown in Table 5. The table contains further data concerning catalyst productivity (CP), melt flow index (MFI) as specified in DIN 53 735 and density (d) as specified in DIN 53 479.

TABLE 1

Polymerization tests: 200 $dm^3$ reactor;
85° C., 100 $dm^3$ of diesel oil, 7 kg/hour of ethylene,
Pressure (maximum) 9.5 bar, 50% by volume of hydrogen in the gas space

| Catalyst | $n_c^{1)}$ [mmol] | $n_{AIR_3}^{2)}$ [mmol] | $CP^{3)}$ [kg/g] | MFI 190/5$^{4)}$ [g/10'] | $BD^{5)}$ [g/cm³] | $d_{50}^{6)}$ [μm] |
|---|---|---|---|---|---|---|
| Op. No. 2.1 | 1 | 14 | 22$^{7)}$ | 9.5 | 0.37 | 150 |
| Op. No. 2.5 | 1.1 | 14 | 18$^{7)}$ | 10.0 | 0.36 | 140 |
| Op. No. 2.2 | 0.9 | 14 | 50$^{8)}$ | 16 | 0.37 | 260 |
| Op. No. 2.3 | 0.9 | 14 | 55$^{8)}$ | 17 | 0.34 | 440 |
| Op. No. 2.4 | 0.9 | 14 | 50$^{8)}$ | 16 | 0.31 | 480 |

$^{1)}$Amount of catalyst in mmol of transition metal (Ti) compound
$^{2)}$Amount of co-catalyst (Al($C_2H_5)_3$)
$^{3)}$Catalyst productivity (kg of PE/g of catalyst)
$^{4)}$Melt flow index as specified in DIN 53 735
$^{5)}$Bulk density as specified in DIN 53 468
$^{6)}$$d_{50}$ value from logarithmic standard distribution as specified in DIN 66 144
$^{7)}$Ti content of the catalyst: 1.47 mmol/g
$^{8)}$Ti content of the catalyst: 1.73 mmol/g

TABLE 2

Particle size distribution analysis of the PE powders
Original weight: 100 g; final weight in g on the sieve indicated
Component a
Operational No.

| Sieve | 2.1 | 2.5 | 2.2 | 2.3 | 2.4 |
|---|---|---|---|---|---|
| 1000 μm | — | — | — | 4.0 | 10.3 |
| 800 μm | — | — | — | 4.6 | 8.8 |
| 600 μm | — | — | 1.0 | 4.8 | 10.4 |
| 500 μm | — | — | 3.5 | 16.4 | 15.9 |
| 400 μm | — | — | 4.3 | 29.5 | 24.4 |
| 300 μm | 2.6 | 2.9 | 21.5 | 22.5 | 19.5 |
| 250 μm | 5.1 | 4.3 | 21.4 | 8.3 | 5.3 |
| 200 μm | 13.4 | 15.2 | 28.1 | 8.2 | 4.0 |
| 150 μm | 29.2 | 28.8 | 15.1 | 1.5 | 1.0 |
| 100 μm | 34.8 | 34.2 | 4.8 | 0.3 | 0.2 |
| 63 μm | 13.5 | 12.5 | — | — | — |
| <63 μm | 1.5 | 2.0 | 0.2 | — | — |
| $d_{50}$/μm | 150 | 140 | 260 | 440 | 480 |
| <100 μm/% by weight | 15 | 14.5 | 0.2 | <0.1 | <0.1 |

TABLE 3

Polymerization tests in 200 $dm^3$ reactor;
85° C., 100 $dm^3$ of diesel oil, 7 kg/hour of ethylene,
Pressure (maximum) 9.5 bar, 36% by volume of hydrogen in the gas space

| Catalyst | $n_c^{1)}$ [mmol] | $n_{AIR_3}^{2)}$ [mmol] | $CP^{3)}$ [kg/g] | MFI 190/5$^{4)}$ [g/10'] | $BD^{5)}$ [g/cm³] | $d_{50}^{6)}$ [μm] |
|---|---|---|---|---|---|---|
| Op. No. 3.1 | 2 | 40 | 25$^{7)}$ | 6.0 | 0.38 | 160 |
| Op. No. 3.2 | 2 | 40 | 45$^{8)}$ | 6.0 | 0.38 | 290 |

Legend, see Table 1
$^{7)}$Ti content of the catalyst: 0.85 mmol/g
$^{8)}$Ti content of the catalyst: 1.7 mmol/g
Particle size distributions, see Table 2
According to gel permeation measurements these are products having a narrow molecular weight distribution and $M_w/M_n$ values between 4.5 and 5.5

TABLE 4

Polymerization tests in 200 $dm^3$ reactor;
85° C., 100 $dm^3$ of diesel oil, 7 kg/hour of ethylene,
Pressure (maximum) 9.5 bar, 55% by volume of hydrogen in the gas space

| Catalyst | $n_c^{1)}$ [mmol] | $n_{AIR_3}^{2)}$ [mmol] | $CP^{3)}$ [kg/g] | MFI 190/5$^{4)}$ [g/10'] | $BD^{5)}$ [g/cm³] | $d_{50}^{6)}$ [μm] |
|---|---|---|---|---|---|---|
| Op. No. 4.1 | 9 | 100 | 10 | 2.8 | 0.37 | 190 |
| Op. No. 4.2 | 9 | 100 | 11 | 3.0 | 0.38 | 210 |
| Op. No. 4.3 | 9 | 100 | 25 | 4.0 | 0.35 | 350 |

Legend, see Table 1
Difference:
$^{9)}$Co-catalyst: isoprenylaluminum

TABLE 5

Polymerization tests in 200 $dm^3$ reactor;
85° C., 100 $dm^3$ of diesel oil, 7 kg/hour of ethylene,
Pressure (maximum) 9.5 bar, 50% by volume of hydrogen in the gas space

| Catalyst | $n_c^{1)}$ [mmol] | $n_{AIR_3}^{2)}$ [mmol] | $CP^{3)}$ [kg/g] | MFI 190/5$^{4)}$ [g/10'] | $BD^{5)}$ [g/cm³] | $d_{50}^{6)}$ [μm] |
|---|---|---|---|---|---|---|
| Op. No. 5.1 | 1.5 | 25 | 30 | 3.0 | 0.34 | 150 |
| Op. No. 5.2 | 1.5 | 25 | 30 | 3.5 | 0.32 | 160 |

TABLE 5-continued

Polymerization tests in 200 dm³ reactor;
85° C., 100 dm³ of diesel oil, 7 kg/hour of ethylene,
Pressure (maximum) 9.5 bar, 50% by volume of hydrogen in the gas space

| Catalyst | $n_c^{1)}$ [mmol] | $n_{AIR_3}^{2)}$ [mmol] | $CP^{3)}$ [kg/g] | MFI 190/5$^{4)}$ [g/10'] | BD$^{5)}$ [g/cm³] | $d_{50}^{6)}$ [µm] |
|---|---|---|---|---|---|---|
| Op. No. 5.3 | 1.0 | 20 | 50 | 4.0 | 0.30 | 280 |
| Op. No. 5.4 | 1.0 | 20 | 50 | 4.5 | 0.30 | 290 |

Legend, see Table 1
Difference:
$^{10)}$Co-catalyst: triisobutylaluminum

TABLE 6

Polymerization tests in 200 dm³ reactor; 85° C., 100 dm³ of diesel oil, 5 kg/hour of ethylene,
40% by volume of hydrogen in the gas space, Catalyst operation no. 4.3

| Comonomer | Volume of comonomer after 5 minutes/dm³ | Volume of comonomer subsequently added/dm³ | $n_c$ [mmol] | $n_{AIR_3}$ [mmol] | p [bar] | CP [kg/g] | MFI/190/5 [g/10'] | d [g/cm³] | BD [g/cm³] | $d_{50}$ [µm] |
|---|---|---|---|---|---|---|---|---|---|---|
| Propene | 0.5 | 2.9 | 0.15 | 120 | 4 | 35 | 1.4 | 0.935 | 0.37 | 390 |
| 1-Butene | 0.45 | 1.3 | 0.15 | 120 | 4 | 33 | 1.2 | 0.940 | 0.35 | 370 |
| 1-Hexene | 0.8 | 4.2 | 0.20 | 150 | 5 | 36 | 1.1 | 0.941 | 0.35 | 390 |
| 1-Octene | 1.1 | 8.9 | 0.25 | 300 | 6 | 32 | 1.2 | 0.941 | 0.34 | 380 |

I claim:

1. A process for the preparation of a poly-1-olefin by polymerizing a 1-olefin of the formula $R^4CH=CH_2$ in which $R^4$ is hydrogen or an alkyl radical having 1 to 10 carbon atoms, in solution or in the gas phase, at a temperature of 20° to 200° C. and under a pressure of 0.5 to 50 bar, in the presence of a catalyst comprising the reaction product of the components comprising a magnesium alcoholate with a transition metal compound (component A) and an organometallic compound of a metal of group I, II or III of the periodic table (component B), which comprises carrying out the polymerization in the presence of a catalyst in which the component A has been prepared by reacting a transition metal compound of titanium, zirconium, vanadium or chromium with a gel-like dispersion containing the magnesium alcoholate in an inert, saturated hydrocarbon, wherein the dispersed magnesium alcoholate has an average particle size of approximately $\leq 1$ µm, wherein said gel-like dispersion containing a dispersed magnesium alcoholate is prepared by suspending the magnesium alcoholate in an inert, saturated hydrocarbon liquid to form a magnesium alcoholate suspension, and subjecting said suspension to dispersing by a high-speed disperser for a period of time sufficient to convert the suspension to a gel-like dispersion.

2. The process as claimed in claim 1, wherein the component A, before the polymerization reaction, is preactivated with a part of the component B at a temperature of –30° C. to 150° C. and the remainder of component B is added in the polymerization reactor at a temperature of 20° to 200° C.

3. The process as claimed in claim 1, wherein the magnesium alcoholate is a compound of the formula $Mg(OR^1)(OR^2)$ in which $R^1$ and $R^2$ are identical or different and are each an alkyl radical having 1 to 6 carbon atoms.

4. The process as claimed in claim 3, wherein said compound is $Mg(OC_2H_5)_2$, $Mg(O\text{—}n\text{—}C_3H_7)_2$ or $Mg(O\text{—}i\text{—}C_3H_7)_2$.

5. A process for the preparation of a catalyst for the polymerization of a 1-olefin, said catalyst comprising (a) a transition metal component, and
(b) an organometallic compound of a metal of group I, II, or III of the periodic table, said process comprising:
preparing the transition metal component by reacting a transition metal compound of titanium, zirconium, vanadium, or chromium with a gel-like dispersion containing a dispersed magnesium alcoholate, said dispersed magnesium alcoholate having an average particle size of approximately $\leq 1$ µm, wherein said gel-like dispersion containing a dispersed magnesium alcoholate is prepared by suspending the magnesium alcoholate in an inert, saturated hydrocarbon liquid to form a magnesium alcoholate suspension, and subjecting said suspension to dispersing by a high-speed disperser for a period of time sufficient to convert the suspension to a gel-like dispersion.

6. The process as claimed in claim 5, wherein the magnesium alcoholate is a compound of the formula $Mg(OR^1)(OR^2)$ in which $R^1$ and $R^2$ are identical or different and are each an alkyl radical having 1 to 6 carbon atoms.

7. The process as claimed in claim 5, wherein the magnesium alcoholate is $Mg(OC_2H_5)_2$, $Mg(O\text{—}n\text{—}C_3H_7)_2$ or $Mg(O\text{—}i\text{—}C_3H_7)_2$.

8. The process as claimed in claim 5, wherein said dispersing by a high-speed disperser is carried out for at least 3 hours.

9. A process for the preparation of a poly-1-olefin by polymerizing a 1-olefin of the formula $R^4CH=CH_2$ in which $R^4$ is hydrogen or an alkyl radical having 1 to 10 carbon atoms, comprising: carrying out the polymerization in the presence of a catalyst prepared by the method of claim 5.

10. A process as claimed in claim 9, wherein the poly-1-olefin comprises ethylene.

11. A process as claimed in claim 9, wherein the poly-1-olefin is a mixture comprising at least 50% by weight of ethylene and a polymerizable amount, up to 50% by weight of the mixture, of a second 1-olefin in which $R^4$ is an alkyl radical having 1 to 10 carbon atoms.

12. A process as claimed in claim 9, wherein the poly-1-olefin resulting directly from said process is particulate but is free of fine particles having particle diameters less than 100 µm.

13. A process for the preparation of a catalyst for the polymerization of a 1-olefin, said catalyst comprising (a) a transition metal component, and
(b) an organometallic compound of a metal of group I, II, or III of the periodic table, said process comprising:
preparing the transition metal component by reacting a transition metal compound of titanium, zirconium, vanadium, or chromium with a gel-like dispersion containing a dispersed magnesium alcoholate, said dispersed magnesium alcoholate having an average particle size of approximately ≦1 μm, having a viscosity greater than that of a suspension of magnesium alcoholate, and having a slower settling rate than that of a suspension of magnesium alcoholate; said gel-like dispersion containing a dispersed magnesium alcoholate having been prepared by:

suspending the magnesium alcoholate in an inert, saturated hydrocarbon liquid to form a magnesium alcoholate suspension, and subjecting said suspension to dispersing by a high-speed disperser for a period of time sufficient to convert the suspension to a gel-like dispersion, said period of time being at least 3 hours.

14. The process as claimed in claim 13, wherein the magnesium alcoholate is a compound of the formula $Mg(OR^1)(OR^2)$ in which $R^1$ and $R^2$ are identical or different and are each an alkyl radical having 1 to 6 carbon atoms.

15. The process as claimed in claim 13, wherein the magnesium alcoholate is $Mg(OC_2H_5)_2$, $Mg(O-n-C_3H_7)_2$ or $Mg(O-i-C_3H_7)_2$.

* * * * *